(12) United States Patent
Iizumi et al.

(10) Patent No.: US 10,752,835 B2
(45) Date of Patent: Aug. 25, 2020

(54) DISPERSION SOLUTION OF SEMICONDUCTOR SINGLE-LAYER CARBON NANOTUBE

(71) Applicant: NATIONAL INSTITUTE OF ADVANCED INDUSTRIAL SCIENCE AND TECHNOLOGY, Tokyo (JP)

(72) Inventors: Yoko Iizumi, Ibaraki (JP); Toshiya Okazaki, Ibaraki (JP); Hajime Sakakita, Ibaraki (JP); Jaeho Kim, Ibaraki (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 483 days.

(21) Appl. No.: 15/657,543

(22) Filed: Jul. 24, 2017

(65) Prior Publication Data

US 2017/0335185 A1 Nov. 23, 2017

Related U.S. Application Data

(63) Continuation of application No. PCT/JP2016/051660, filed on Jan. 21, 2016.

(30) Foreign Application Priority Data

Jan. 23, 2015 (JP) .................. 2015-011582

(51) Int. Cl.
| | |
|---|---|
| C09K 11/65 | (2006.01) |
| B82Y 20/00 | (2011.01) |
| B82Y 40/00 | (2011.01) |
| C01B 32/168 | (2017.01) |
| B01J 19/12 | (2006.01) |
| C09K 11/02 | (2006.01) |
| B82Y 30/00 | (2011.01) |

(52) U.S. Cl.
CPC ............ *C09K 11/65* (2013.01); *B01J 19/123* (2013.01); *B82Y 20/00* (2013.01); *B82Y 40/00* (2013.01); *C01B 32/168* (2017.08); *C09K 11/025* (2013.01); *B01J 2219/0879* (2013.01); *B01J 2219/1203* (2013.01); *B82Y 30/00* (2013.01); *C01B 2202/02* (2013.01); *Y10S 977/748* (2013.01); *Y10S 977/751* (2013.01); *Y10S 977/847* (2013.01); *Y10S 977/95* (2013.01)

(58) Field of Classification Search
CPC ..... C09K 11/65; C09K 11/025; C01B 32/168; C01B 2202/02; B01J 19/123; B01J 2219/0879; B01J 2219/1203; B82Y 20/00; B82Y 40/00; Y10S 977/748; Y10S 977/751; Y10S 977/847; Y10S 977/95

USPC ................................................... 252/301.4 F
See application file for complete search history.

(56) References Cited

U.S. PATENT DOCUMENTS

| | | |
|---|---|---|
| 2006/0013758 A1 | 1/2006 | Iijima et al. |
| 2010/0189626 A1 | 7/2010 | Tanaka et al. |

FOREIGN PATENT DOCUMENTS

| | | |
|---|---|---|
| CN | 1678522 A | 10/2005 |
| JP | 2004-210608 A | 7/2004 |
| JP | 2008-285386 A | 11/2008 |
| JP | 2008-285387 A | 11/2008 |

OTHER PUBLICATIONS

Japanese Office Action dated Apr. 2, 2019, in connection with corresponding JP Application No. 2016-570694 (4 pgs., including partial English translation).
Chinese Office Action dated Sep. 23, 2019, in connection with corresponding CN Application No. 201680006878.3 (15 pgs., including machine-generated English translation).
Saunab Ghosh, et al., "Oxygen Doping Modified Near-Infrared Band Gaps in Fluorescent Single-Walled Carbon Nanotubes", Science, Dec. 17, 2010, vol. 330, 5 pgs., including Saunab Ghosh, et al., "Supporting Online Material" for "Oxygen Doping Modified Near-Infrared Band Gaps in Fluorescent Single-Walled Carbon Nanotubes", published Nov. 25, 2010 on Science Express: www.sciencemag.org/cgi/content/full/science, 27 pgs., (31 pgs. total).
Office Action dated Jan. 4, 2019 in corresponding Korean Application No. 10-2017-7023208; 7 pages.
Simmons et al.; "Effect of Ozone Oxidation on Single-Walled Carbon Nanotubes"; J. Phys. Chem. B; vol. 110; No. 14; 2006, pp. 7113-7118.
English translation of Written Opinion dated Apr. 5, 2016 from corresponding of International Application No. PCT/JP2016/051660 (5 pages).
Ghosh et al., "Oxygen Doping Modifies Near-Infrared Band Gaps in Fluorescent Single-Walled Carbon Nanotubes", Science 330, 1656-1659 (2010) , 5 pgs.
Miyauchi et al., "Brightening of excitons in carbon nanotubes on dimensionality modification", Nat. Photonics, 7, 715-719 (2013), 5 pgs.
Piao et al., "Brightening of carbon nanotube photoluminescence through the incorporation of sp3 defects", Nat. Chem., 5, 840-845 (2013), 6 pgs.

(Continued)

*Primary Examiner* — Edward M Johnson
(74) *Attorney, Agent, or Firm* — Maier & Maier, PLLC

(57) ABSTRACT

Exemplary Embodiments of the invention address the problem of providing semiconductor single-layer carbon nanotubes in which the light emission energy thereof is lowered by approximately 300 meV, and a method for manufacturing the same. In one embodiment of the invention, by applying a method for directly irradiating semiconductor single-layer carbon nanotubes with ultraviolet light in atmospheric air, ozone is generated in the atmosphere, a gram amount of oxygen atoms is introduced to the semiconductor single-layer carbon nanotubes, and semiconductor single-layer carbon nanotubes in which the light emission energy thereof is lowered by approximately 300 meV.

4 Claims, 2 Drawing Sheets

(56) References Cited

OTHER PUBLICATIONS

Zhang et al., "Propagative Sidewall Alkylcarboxylation that Induces Red-Shifted Near-IR Photoluminescence in Single-Walled Carbon Nanotubes", JPCL, 4, 826-830 (2013), 5 pgs.
Brozena et al., "Controlled Defects in Semiconducting Carbon Nanotubes Promote Efficient Generation and Luminescence of Trions" ACS Nano, 8, 4239-4247 (2014), 9 pgs.
X. Ma et al., "Electronic Structure and Chemical Nature of Oxygen Dopant States in Carbon Nanotubes", ACS Nano, 8, 10782-10789 (2014), 8 pgs.
International Search Report and Written Opinion dated Apr. 5, 2016 of corresponding application No. PCT/JP2016/051660; 9 pgs.

DISPERSION SOLUTION OF SEMICONDUCTOR SINGLE-LAYER CARBON NANOTUBE

CROSS REFERENCE TO RELATED APPLICATIONS

This application is based upon and claims the benefit of priority from the prior Japanese Patent Application No. 2015-011582, filed on Jan. 23, 2015, and PCT Application No. PCT/JP2016/051660, filed on Jan. 21, 2016, the entire contents of which are incorporated herein by reference.

FIELD

The present invention relates to near-infrared light-emitting semiconductor single-walled carbon nanotubes and methods for manufacturing the same and, in particular, to a semiconductor single-walled carbon nanotube having a longer emission wavelength and a method for manufacturing the same.

BACKGROUND

Carbon nanotubes (hereinafter also referred to as "CNTs") are carbon structures in which a carbon sheet (i.e. a sheet of graphite) constituted by carbon atoms planarly arranged in a hexagonal pattern is cylindrically closed. These CNTs are categorized into multi-walled and single-walled CNTs. Single-walled CNTs (hereinafter also referred to as "SWCNTs") are known to have such electronic properties as to exhibit metallic properties or semiconducting properties depending on the way in which they are wound (i.e. the diameter and the degree of helicity).

Semiconductor SWCNTs, which absorb and emit light in a near-infrared region (800 to 2000 nm) where biopenetrability is high, are expected to be extremely useful as fluorescent probes that detect the functions of cells and organisms. Among them, a wavelength region of 1200 to 1400 nm is a region where biopenetrability is highest.

By introducing oxygen atoms or functional groups into these semiconductor SWCNTs, a change in emission wavelength can be effected. For example, irradiating, with light, a mixture of an aqueous solution containing SWCNTs dispersed by a surfactant and water containing ozone added thereto causes a chemical reaction whereby oxygen atoms partially substitute for carbon in the nanotube walls (Ghosh et al., Science, 330, 1656-1659 (2010) and Miyauchi et al., Nat. Photonics, 7, 715-719 (2013)). In a case where oxygen atoms are introduced in this way, most of the oxygen atoms form ether bonds with the SWCNT walls, with the result that the SWCNTs become lower in emission energy than they originally were by approximately 150 meV. Such a chemical modification also has the advantage of increasing the luminescent quantum yield of the SWCNTs.

In addition, by covalently introducing functional groups into semiconductor SWCNTs by an organic synthesis technique, the emission energy can be reduced by approximately 160 to 260 meV (Piao et al., Nat. Chem., 5, 840-845 (2013), Zhang et al., JPCL, 4, 826-830 (2013), and Brozena et al., ACS Nano, 8, 4239-4247 (2014)). For example, in the case of binding of hexanoic acid, the emission energy of the SWCNTs undergoes a low energy shift of 260 meV, and the emission of light from the SWCNTs is believed to be attributed to trion generation (Brozena et al., ACS Nano, 8, 4239-4247 (2014)).

SUMMARY

As mentioned earlier, it has been known that the introduction of oxygen or functional groups into semiconductor SWCNTs lowers the emission energy and lengthens the emission wavelength. However, according to Ghosh et al., Science, 330, 1656-1659 (2010), Miyauchi et al., Nat. Photonics, 7, 715-719 (2013), Piao et al., Nat. Chem., 5, 840-845 (2013), Zhang et al., JPCL, 4, 826-830 (2013) and Brozena et al., ACS Nano, 8, 4239-4247 (2014), which report the lengthening of emission wavelengths, the emission wavelength of a main product of SWCNTs having a chiral index of (6, 5), which are one of the currently most studied varieties of SWCNT, has a peak at approximately 1140 nm (approximately 1.088 eV), which is shorter than approximately 1300 to 1400 nm, which is believed to be most favorable to near-infrared fluorescent probes.

The present invention has been made in view of such circumstances and has as an object to lengthen an emission wavelength by attaining a greater emission energy shift than ever and, in particular, to provide semiconductor SWCNTs that are suitable as histological or biomedical penetrable near-infrared fluorescent probes and have an emission wavelength whose peak lies at a wavelength having biopenetrability.

The inventors of the present invention diligently studied to attain the foregoing object. As a result, they found that a gram amount of oxygen atoms can be quickly and easily introduced into SWCNTs by applying oxidation treatment to the SWCNTs with ozone generated in the atmosphere by employing a method for directly irradiating SWCNTs with ultraviolet rays in the atmosphere instead of a wet method, such as that disclosed in Ghosh et al., Science, 330, 1656-1659 (2010) and Piao et al., Nat. Chem., 5, 840-845 (2013), for irradiating an ozone-containing dispersion solution of SWCNTs and that the resulting SWCNTs have an emission wavelength whose peak has changed from 980 nm (1.265 eV) to 1280±13 nm (=0.9686±0.01 eV) or, in other words, have an emission energy having undergone the greatest low energy shift of 296±10 meV ever attained.

The present invention has been accomplished on the basis of these findings, and the present invention provides the following inventions:

[1] A method for manufacturing a near-infrared light-emitting semiconductor single-walled carbon nanotube, comprising applying oxidation treatment to a semiconductor single-walled carbon nanotube with ozone generated by directly irradiating the semiconductor single-walled carbon nanotube with ultraviolet rays in an atmosphere.
[2] The method for manufacturing a near-infrared light-emitting semiconductor single-walled carbon nanotube according to [1], wherein before being irradiated with the ultraviolet rays, the semiconductor single-walled carbon nanotube is formed into a thin film on a substrate.
[3] The method for manufacturing a near-infrared light-emitting semiconductor single-walled carbon nanotube according to [1] or [2], wherein the oxidation treatment is executed in an enclosed space.
[4] A near-infrared light-emitting semiconductor single-walled carbon nanotube manufactured by the method according to any one of [1] to [3], wherein the semiconductor single-walled carbon nanotube has an emission energy having undergone a low energy shift.
[5] The near-infrared light-emitting semiconductor single-walled carbon nanotube according to [4], wherein the emission energy has undergone a low energy shift of 296±10 meV.

[6] The near-infrared light-emitting semiconductor single-walled carbon nanotube according to [4] or [5], wherein the semiconductor single-walled carbon nanotube has an emission wavelength whose peak lies within 1280±13 nm (=0.9686±0.01 eV).

[7] The near-infrared light-emitting semiconductor single-walled carbon nanotube according to any one of [4] to [6], wherein the semiconductor single-walled carbon nanotube has oxygen atoms introduced thereinto.

[8] The near-infrared light-emitting semiconductor single-walled carbon nanotube according to [7], wherein the oxygen atoms are introduced mainly as epoxide.

DESCRIPTION OF EMBODIMENTS

Figure 1:
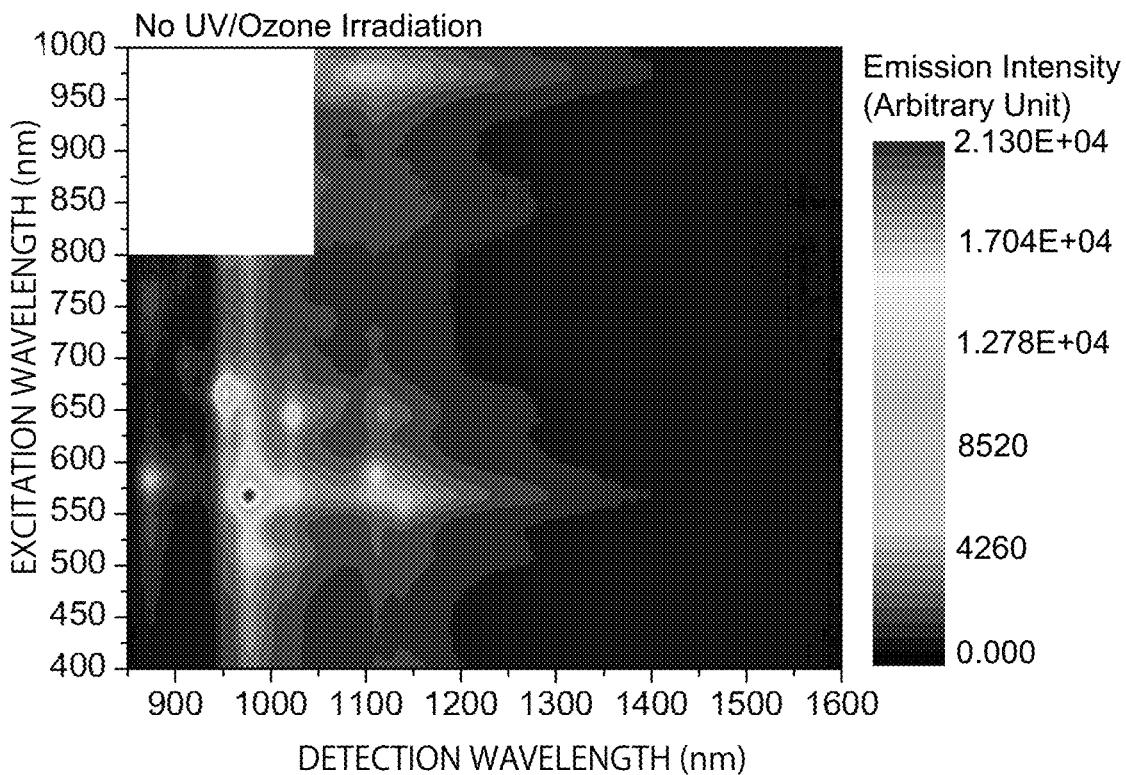
FIG. 1 shows a two-dimensional excitation-emission map of a sample mainly including SWCNTs having a chiral index of (6, 5) with oxygen bound thereto by a method of the present invention and a two-dimensional excitation-emission map of its original sample.
Figure 1:
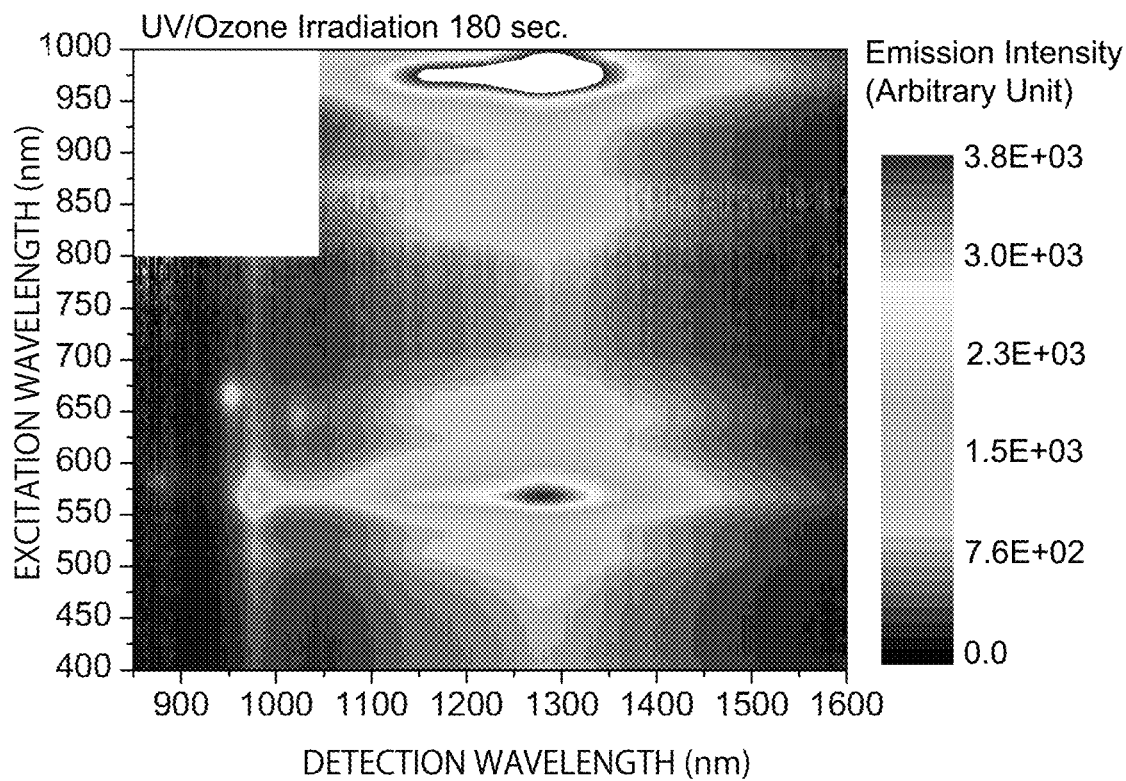

The present invention is directed to a method for, by introducing oxygen atoms into semiconductor SWCNTs, manufacturing near-infrared light-emitting semiconductor SWCNTs having an emission energy having undergone a low energy shift, including applying oxidation treatment to the semiconductor SWCNTs with ozone generated by directly irradiating the semiconductor SWCNTs with ultraviolet rays in an atmosphere. Moreover, near-infrared light-emitting semiconductor SWCNTs manufactured by the method of the present invention can have an emission energy having undergone a low energy shift of 296±10 meV, and in particular, application of the present invention to SWCNTs having a chiral index of (6, 5) allows the SWCNTs to have an emission wavelength whose peak has changed from approximately 980 nm to 1280±13 nm.

Normally, a technique for irradiation with ultraviolet light in the atmosphere is one that is used in the decomposition and removal of extraneous material away from a substrate surface, sterilization, and similar processes. The technique is based on the principle that oxygen in the atmosphere generates ozone ($O_3$) by absorbing ultraviolet rays of a wavelength of 184.9 nm and the ozone thus generated further generates atomic active oxygen (O) by absorbing ultraviolet rays of a wavelength of 253.7 nm.

The method for irradiation with ultraviolet rays is also used for SWCNTs. For example, in Japanese Patent Application Laid-Open No. 2004-210608, by exciting SWCNTs through irradiation with light of a particular single wavelength and oxidizing the excited SWCNTs with oxygen, CNTs of a particular structure are selectively burnt to extinction, whereby CNTs having a different structure from the CNTs are selectively obtained.

The method of the present invention introduces oxygen into SWCNTs without bringing the SWCNTs into extinction like the conventional method and, what is more, makes it possible to attain an emission energy shift of 296±10 meV, which has never been able to be attained by the conventional wet method. Moreover, the introduction of oxygen into the aforementioned SWCNTs having a chiral index of (6, 5) by the same technique allows the SWCNTs to have an emission wavelength whose peak has changed from approximately 980 nm (1.265 eV) to approximately 1280 nm (=0.9686 eV) and, therefore, to have an emission wavelength whose peak lies within a wavelength range that is favorable to near-infrared fluorescent probes and has higher biopenetrability.

As already described, various discussions have so far been conducted on a low energy shift in emission energy by the introduction of oxygen or functional groups into semiconductor SWCNTs. In particular, X. Ma et al., ACS Nano, 8, 10782-10789 (2014) reports on the electronic state calculation of SWCNTs doped with oxygen. X. Ma et al., ACS Nano, 8, 10782-10789 (2014) states that, in the case of epoxidation, the emission energy of the SWCNTs is calculated to undergo a low energy shift of 310 meV.

According to X. Ma et al., ACS Nano, 8, 10782-10789 (2014), a low energy shift exceeding 290 meV has been impossible with the conventional wet method of Ghosh et al., Science, 330, 1656-1659 (2010) and Miyauchi et al., Nat. Photonics, 7, 715-719 (2013) or the like, as most of the oxygen forms an ether bond with the SWCNTs. On the other hand, the method of the present invention allows most of the introduced oxygen to form epoxide with the SWCNTs, thereby presumably allowing the emission energy of the SWCNTs to undergo a low energy shift of 296±10 meV.

The present invention imposes no particular limits on how semiconductor SWCNTs are synthesized or on the diameter of semiconductor SWCNTs obtained thereby. Semiconductor SWCNTs can be synthesized by a publicly-known method such as chemical vapor deposition, arc discharge, or laser vaporization. However, it is preferable that semiconductor SWCNTs be synthesized by chemical vapor deposition in the presence of a catalyst and have a diameter of approximately 0.6 to 1 nm.

The present invention imposes no particular limits on how ozone is generated. However, it is preferable that ozone be generated in an enclosed space. For example, it is preferable that ozone be generated by using a device, such as a UV ozone cleaner, that generates ozone by irradiating the atmosphere with ultraviolet light.

Further, conditions for irradiation with ultraviolet light vary depending on the device used. However, as in Example 2, which will be described later, it is necessary that irradiation with ultraviolet light be performed under the condition that the SWCNTs are not destructed by the irradiation.

Further, it is preferable that before being directly irradiated with ultraviolet rays in the atmosphere, the semiconductor SWCNTs be formed in advance into a film on a substrate. In particular, it is preferable that in order for a chemical reaction to homogeneously take place in the semiconductor SWCNTs after the introduction of oxygen, the semiconductor SWCNTs be formed in advance into a thin film having a thickness of approximately 1 μm.

EXAMPLES

In the following, the present invention is described on the basis of examples. Note, however, that the present invention is not limited by these examples.

Example 1: Semiconductor SWCNT Sample Subjected to Oxidation Treatment with Ozone Generated by Ultraviolet Irradiation In the present example, the original sample used was one mainly including SWCNTs having a chiral index of (6, 5) synthesized by the CoMoCAT method.

One milligram of the SWCNTs was spread onto a 47 mm diameter membrane filter and subjected to oxidation treatment for 0 to 600 seconds with a UV ozone cleaner (PC-450, Meiwafosis Co., Ltd.) (Light source: mercury lamp, with wavelengths of 184.9 nm, 253.7 nm, etc.; Power source: 100 V, 0.5 A).

After that, the oxidized SWCNTs were mixed with 0.1 mg of sodium dodecylbenzenesulfonate (SDBS) in 10 mL of deuterium oxide and dispersed by 10 minutes of ultrasonication (VIBRA-CELL VCX-500, Sonics and Materials Inc.). The resulting dispersion solution was treated in an ultracentrifuge (Himac CS100GXII, Hitachi Koki) (Rotor: S52ST, Number of revolutions: 35000 rpm), and the oxidized SWCNTs were taken out from the supernatant.

FIG. 1 shows two-dimensional excitation-emission maps obtained from the resulting oxidized SWCNT-SDBS deuterium oxide solution and the pre-oxidation treatment SWCNT-SDBS deuterium oxide solution, respectively (Fluorolog FL3-2TRIAX/iHR320, HORIBA). In FIG. 1, the vertical axis represents excitation wavelength, and the horizontal axis represents detection wavelength.

As shown in the upper row of FIG. 1, the pre-oxidation treatment sample mainly exhibits an emission peak at an excitation wavelength of approximately 570 nm and an emission wavelength of approximately 980 nm. This emission peak is derived from the interband transition of the SWCNTs having a chiral index of (6, 5). On the other hand, as shown in the lower row of FIG. 1, the 180-second treatment sample exhibits an emission peak at an emission wavelength with a long-wavelength shift to approximately 1280 nm, but with no change in excitation wavelength. This shift in emission wavelength is attributed to the introduction of oxygen atoms into the SWCNTs.

Example 2

In Example 2, oxidation treatment time dependency, at emission intensities of approximately 980 nm and approximately 1280 nm, of a sample mainly including the aforementioned SWCNTs having a chiral index of (6, 5) was examined.

Figure 2:
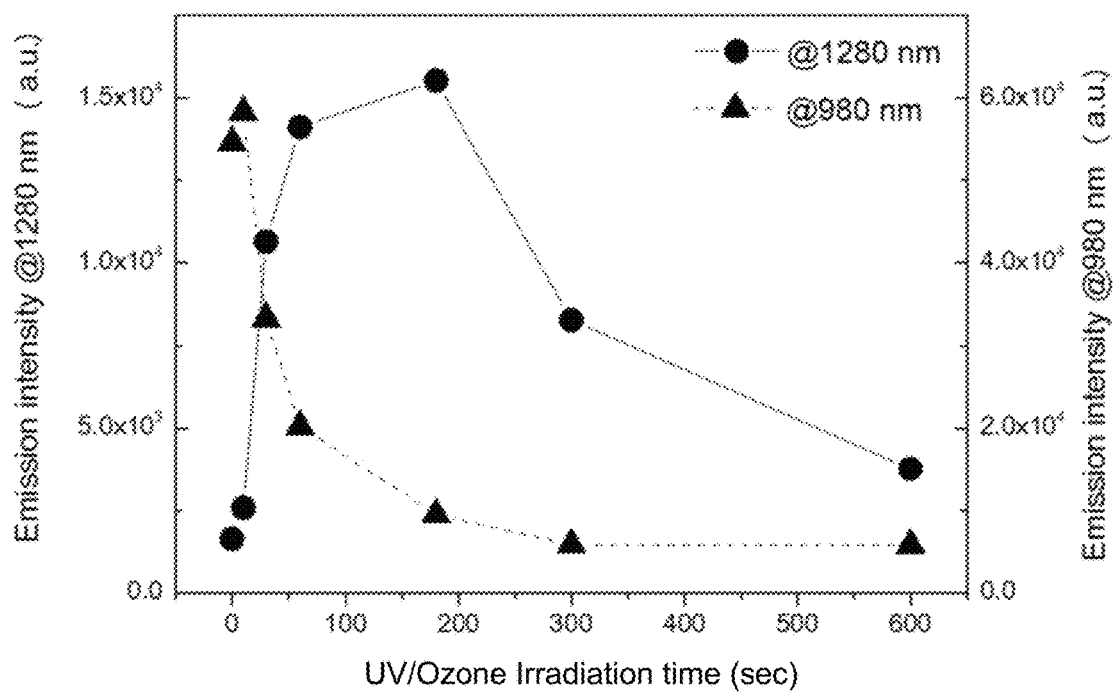
FIG. 2 shows oxidation treatment time dependency, at emission intensities of approximately 980 nm and approximately 1280 nm, of a sample mainly including SWCNTs having a chiral index of (6, 5)

FIG. 2 shows the oxidation treatment time dependency at the emission intensities. The vertical axis represents emission intensity, and the horizontal axis represents irradiation time.

As shown in FIG. 2, the 1280 nm emission (-●-) derived from the oxidized SWCNTs increases with decrease in the 980 nm emission (-▲-) entailed by the interband transition and reaches its maximum at 180 seconds. Then, the intensity decreases with the subsequent increase in reaction time. This decrease in emission intensity is estimated to be attributed to the ongoing destruction of the structure of the SWCNTs by an excessive oxidation reaction.

Figure 3:
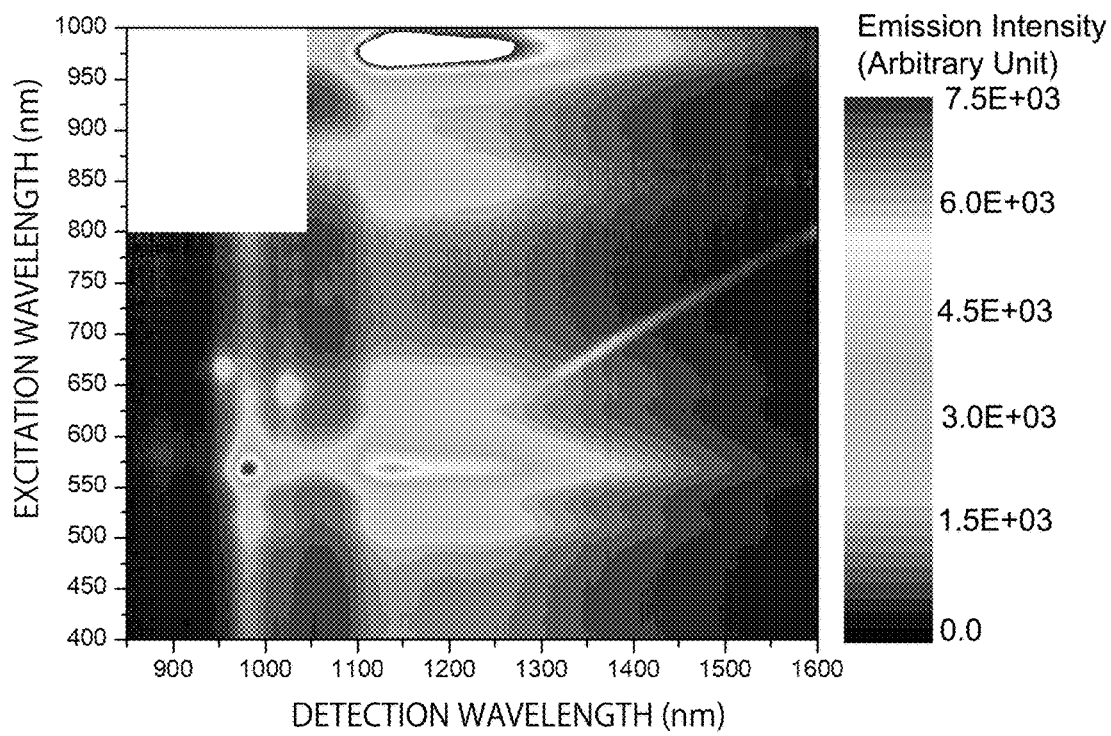
FIG. 3 shows a two-dimensional excitation-emission map of a sample mainly including SWCNTs having a chiral index of (6, 5) with oxygen bound thereto by a technique disclosed in Ghosh et al., Science, 330, 1656-1659 (2010) and Miyauchi et al., Nat. Photonics, 7, 715-719 (2013).

Comparative Example: Semiconductor SWCNT Sample Subjected to Oxidation Treatment by Conventional Method FIG. 3 shows a two-dimensional excitation-emission map obtained from an SWCNT sample subjected to oxidation treatment by the conventional method disclosed in Ghosh et al., Science, 330, 1656-1659 (2010) and Miyauchi et al., Nat. Photonics, 7, 715-719 (2013).

Specifically, an gas mixture of oxygen and ozone taken out from an ozone generator (SO-03UN-OX05, Hamanetsu) was passed through 3 mL of deuterium oxide for approximately 1 minute and bubbled until the absorbance of an absorption peak at a wavelength of 260 nm derived from the ozone became approximately 1.0. Two milliliters of this ozone-containing deuterium oxide and SWCNTs were dispersed in a 1 wt % SDBS deuterium oxide solution. The resulting dispersion solution was treated in an ultracentrifuge to give a supernatant solution, and 400 µL of the supernatant solution was mixed with 1.6 mL of deuterium oxide. The resulting mixed solution was irradiated with ultraviolet light of a wavelength of 254 nm from a transilluminator (CSF-20AC, Cosmo Bio Co., Ltd.) (Intensity: 6400 µW/cm$^2$) for 1 minute to give an oxidized SWCNT solution.

As shown in FIG. 3, the oxidized SWCNT solution prepared by the conventional method emits light mainly at approximately 1140 nm (approximately 1.088 eV) due to the oxidation treatment, and the oxygen is estimated to have formed an ether bond with the SWCNT walls.

Further, unlike Example 1, this method could not exhibit an increase in peak of emission at 1280 nm estimated to be derived from the epoxidation of SWCNTs and oxygen, even with changes in the amount of ozone water that is mixed, irradiation time, and irradiation wavelength.

The present invention makes it possible to provide semiconductor SWCNTs whose emission energy has been lowered by 296±10 meV, which has never been attained by a conventional method. Further, application of the present invention to SWCNTs having a chiral index of (6, 5) allows the SWCNTs to have an emission wavelength whose peak has changed from approximately 980 nm (1.265 eV) to 1280±13 nm (=0.9686±0.01 eV), which has higher biopenetrability, and, therefore, to have an emission wavelength whose peak lies within a wavelength range that is favorable to near-infrared fluorescent probes for use in cells and organisms.

The invention claimed is:

1. A dispersion solution, comprising:
    a semiconductor single-walled carbon nanotube having a chiral index of (6, 5) wherein an oxygen atom is introduced into the semiconductor single-walled carbon nanotube as epoxide,
    wherein the semiconductor single-walled carbon nanotube with the oxygen atom is dispersed in a solvent, and
    the semiconductor single-walled carbon nanotube with the oxygen atom further comprises an emission wavelength from 1200 nm to 1400 nm by irradiation of an excitation light having a wavelength from 450 nm to 1000 nm.

2. The dispersion solution according to claim 1, wherein the solvent is water.

3. The dispersion solution according to claim 1, wherein at least sodium dodecylbenzenesulfonate is mixed in the dispersion solution.

4. The dispersion solution according to claim 1, wherein the semiconductor single-walled carbon nanotube with the oxygen atom emits near-infrared light.

* * * * *